United States Patent [19]
Jönsson

[11] Patent Number: 4,458,193
[45] Date of Patent: Jul. 3, 1984

[54] METHOD AND APPARATUS FOR CONTROLLING AN AC INDUCTION MOTOR

[76] Inventor: Ragnar Jönsson, P.O. Box 48, Krageholm, Sweden, S-270 24

[21] Appl. No.: 287,759
[22] PCT Filed: Dec. 21, 1980
[86] PCT No.: PCT/EP80/00152
 § 371 Date: Jul. 28, 1981
 § 102(e) Date: Jul. 28, 1981
[87] PCT Pub. No.: WO81/02076
 PCT Pub. Date: Jul. 23, 1981

[30] Foreign Application Priority Data

Jan. 8, 1980 [SE] Sweden ............................. 8000118

[51] Int. Cl.³ .............................................. H02P 5/40
[52] U.S. Cl. ...................................... 318/803; 318/807
[58] Field of Search ................. 318/802, 803, 807–811

[56] References Cited

U.S. PATENT DOCUMENTS 3,043,999 7/1962 Anderson .
3,571,681 3/1971 Burns .
4,282,473 8/1981 Dreiseitl et al. .................... 318/803

*Primary Examiner*—David Smith, Jr.
*Attorney, Agent, or Firm*—Ladas & Parry

[57] ABSTRACT

A method and apparatus for controlling an AC induction motor, having at least two phases. The motor is controlled in a known manner by two input signals $S_1$, $S_2$, which are connected to a resolver (1), the output signals of which are used to generate separate supply signals to the motor phases. A measured signal U, representing the rotational speed of the motor, is fed back to the control system and is used for calculating the oscillator frequency of the oscillator (5), which drives the resolver.

A calculating circuit calculates the oscillator frequency as the sum of the first control signal $S_1$ multiplied by a first constant factor, and the tachometer signal U multiplied by a second constant factor.

As a result of this control method the oscillator frequency will increase with increasing control signal $S_1$ and increasing tachometer signal U, but decrease with increasing motor load, because the motor speed will decrease. This automatic frequency adjustment results in constant amplitude of the stator magnetic field at all motor speeds and at all different loads.

2 Claims, 8 Drawing Figures

METHOD AND APPARATUS FOR CONTROLLING AN AC INDUCTION MOTOR

TECHNICAL FIELD

This invention relates to a method and an apparatus for controlling an AC induction motor.

BACKGROUND ART

AC induction motors are normally used for applications which do not require variable speed, while DC motors are more common in applications where speed control is required.

AC induction motors have a simpler construction than DC motors, and they are less susceptible to environmental influence. Especially the fact that commutator and brushes are not used is of great advantage. Thus, for a long time there has been a need to replace DC motors by AC induction motors. In order to make this possible there is required a control system for an AC induction motor. Today many different control systems for AC induction motors are available on the market.

Most commercially available control systems generate control signals in a relatively simple way. The amplitude and frequency of the motor control signals are generated as a certain, invariable function of the input signal. It is possible to show, that such control systems operate well at high motor speeds, but unsatisfactory at motor speeds close to zero.

The expensive parts of a motor control system are the "power amplifiers" (e.g. thyristor frequency inverters which transform the fixed voltage and frequency of the AC power line into variable voltage and frequency). The "signal circuits" for generation of the control signals operate at low power, and their cost is almost negligible in comparison with the power amplifiers. Thus, it is of great technical and commercial interest to create better control systems with help of better "signal circuits". Also improvement of details are important. As a basis for the design of the "signal circuits" an optimal control theory or strategy must be developed. The "signal circuits" may then be realized using any technical means, e.g. digital or analog electronic circuits.

A general control systems for AC induction motors should permit four quadrant operation, that is active drive and brake in both directions of rotation. Furthermore, full torque should be available at all speeds, including zero speed. It should be possible to operate the motor in so-called open control systems (without feedback) as well as in so-called closed control systems (with feedback). In the latter case the dynamic performance of the control system is essential. The motor must react on the input control signal without unnecessary time delay. An optimally constructed control system gives the AC induction motor a dynamic performance comparable to that of the DC-motor, and this possibility should be made use of.

Among existing AC motor control systems it is possible to distinguish between two principally different control methods. According to the first method, here named "Type I", the motor is considered as a separate component. It is controlled by externally generated control signals. According to the second method, here named "Type II", the motor is an active part of the control system. Measured signals from the motor itself are fed back to the control system and influence the generation of control signals.

From a theoretical point of view "Type II" should be the best control system. Common for all types of modern process control is the requirement to collect information about the process "state" by measuring all "state variables". Knowing the "state" of the process it is possible to generate optimal control signals. However, it is difficult to obtain suitable measuring signals from the motor, especially from a standard motor. For this reason, control systems of "Type II" are uncommon.

Control systems of "Type I" may give good results, if the theoretical motor model, which is the basis for the control system, is correct, and if external disturbances are taken into account. If the operating range of the control systems is reduced, for example by excluding speeds close to zero, a very simple control system may give good results. The simplest system, operating with constant speed on the fixed voltage and frequency of the power line, is known to work excellently.

The Swedish Pat. No. 334,671 discloses a method according to "Type I" which improves the control possibility at low speeds, including zero speed. Especially the response time on control signals is shortened, which makes the AC induction motor suitable for closed loop control systems. This control system will be described in detail later, and some drawbacks will be shown.

DISCLOSURE OF THE INVENTION

An object of the present invention is to create a new method (according to "Type I" above) and a corresponding apparatus for control of an AC induction motor, which in some respects gives better performance than prior methods.

An induction motor controlled according to the method of the invention will have the same performance as a controlled DC motor, statically as well as dynamically. Maximum torque is obtained at all speeds, and the reaction time on control signals is minimized. A normal standard motor can be used without any need of modification or addition of measuring equipment on the motor. However, a measuring device (tachometer or equivalent) for the motor speed is required. The circuits for signal processing are simple and cheap companed to the power amplifiers, which are of conventional design. This makes applications possible at all motors, from the smallest to the biggest. The motor can be operated in four quadrants with active drive or brake in both directions of rotation. The motor can be used in open systems as well as in closed control loops. Any outer control loop is designed conventionally according to known control theory.

According to the invention, a method is disclosed for controlling an AC induction motor comprising a stator, a rotor and at least two phase windings, within its whole speed range down to and including zero speed in both directions, in dependence of two control signals. The first signal ($S_1$) controls essentially the rotation speed and the torque of the motor and the second signal ($S_2$) controls essentially the magnetic field of the motor. The control signals are fed to the resolver the output signals of which are fed to power amplifiers which generate separate drive voltages to the phase windings of the motor. According to the invention a measured signal U representing the rotational speed of the motor is fed back to the control system and controls the frequency w of the oscillator driving the resolver in accordance with the formula $$w = S_1 \times \frac{R_R}{LI_L(R_S + R_R)} + U \times \frac{R_S}{LI_L(R_S + R_R)}$$

where
- $R_S$ = resistance of the stator winding
- $R_R$ = resistance of the rotor winding
- $L$ = inductance of the stator winding
- $I_L$ = the magnetizing current of the stator winding
- $U$ = the counter-electromotive voltage of the rotor winding
- $S_1$ = the first control signal
- $w$ = frequency of the oscillator By this control method, the stator magnetic field will automatically retain constant amplitude at all rotational speeds and all loads as discussed in all details below.

BRIEF DESCRIPTION OF DRAWINGS

The above and other features of the invention will be fully understood from the following detailed description by reference to the accompanying drawings, in which.

In the figures, components performing the same operation have been given the same reference numbers.

BEST MODE OF CARRYING OUT THE INVENTION AND INDUSTRIAL APPLICABILITY

Figure 1:
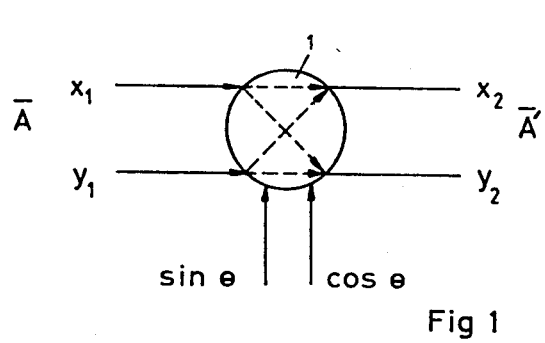
FIG. 1 is a schematic diagram showing the symbol of a resolver, which is used as a building block in the following figures.

FIG. 1 shows the symbol for the resolver 1. This is a device normally used in circuits for trigonometric calculations. An input signal vector $A = (x_1, y_1)$ is rotated an angle and obtains the new value $A' = (x_2, y_2)$. The length of the vector is not changed.

Figure 2:
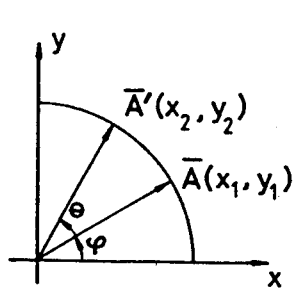
FIG. 2 is a schematic diagram, which defines the coordinate system used in the resolver.

The following trigonometric relations are valid:

$x_1 = A \cos \phi$ $y_1 = A \sin \phi$ $x_2 = A \cos(\phi + \theta) = A \cos \phi \cos \theta - A \sin \phi \sin \theta$ $y_2 = A \sin(\phi + \theta) = A \sin \phi \cos \theta + A \cos \phi \sin \theta$ FIG. 2 defines the coordinate system used in the resolver and in the following specification. The X-axis and the Y-axis are stationary in relation to the motor stator. Positive rotation is counter-clockwise from the X-axis. To make the following block diagrams clearer, it is pointed out that the input vector $A = (x_1, y_1)$ to a control apparatus according to the invention is composed of variable DC-values (control signals). This vector is not rotating. The rotation angle $\theta$ is almost synchronous with the rotor of the induction motor. Therefore the output vector $A' = (x_2, y_2)$ will be rotating, and $x_2$ and $y_2$ will be AC values.

Figure 3:
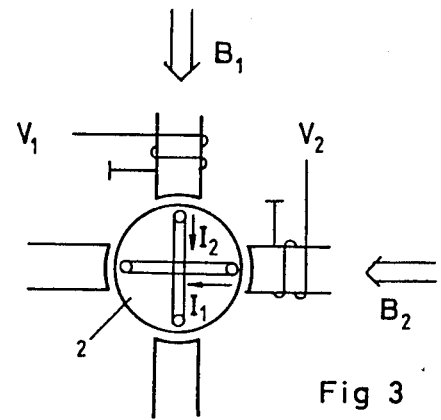
FIG. 3 is a schematic diagram of a two-phase induction motor.

FIG. 3 is a simplified schematic diagram of a two-phase induction motor. Normally the motor function is described by means of the rotating stator magnetic field and the rotor "slip" relative to this magnetic field. In order to describe the control system according to the invention it is better to observe the similarity between the DC motor and the AC induction motor. Both motor types create torque by cooperation between the stator magnetic field and the rotor current. Furthermore, both motor types require, that the rotor current is fed through those rotor windings which are located where the stator magnetic field has maximum strength. The DC motor has a stationary stator magnetic field, and the rotor current is fed to the desired rotor windings by means of the commutator.

The understanding of the AC motor is more complicated because the same stator windings are used for the field current (stator magnetic field) as well as for the rotor current (torque generation). The rotor current is transformed from the stator winding to the rotor winding. Doing this, the rotation of the stator magnetic field is obtained as a "non-intentional" secondary effect. When current is fed to the primary winding of a transformer this results in a current in the secondary winding. This is the "intentional" transformer operation. However, the applied current will build up a magnetic field in the primary winding. This new magnetic field will change the original stator magnetic field, and in the motor it can be described as a rotation of the original field. The motor control system must take this field rotation into consideration and create control signals which, so to say, "follow" the stator field rotation.

In FIG. 3, $V_1$, $V_2$ are supply voltages and $B_1$, $B_2$ the generated magnetic field components. Only those rotor windings with maximum coupling to the stator windings are shown. $I_1$, $I_2$ are the induced currents in the rotor windings shown.

The following (idealized) relations are valid:

$V_1 = V_0 \sin wt$; $B_1 = -B_0 \cos wt$; $I_1 = I_0 \sin wt$ $V_2 = V_0 \cos wt$; $B_2 = B_0 \sin wt$; $I_2 = I_0 \cos wt$ $w$ = signal frequency (radians/second)

The magnetic field from one phase co-operates with the rotor current from the other phase. This is of fundamental importance for the operation of the motor. Thus, current $I_1$ generates torque together with magnetic field $B_2$. In the same way $I_2$ generates torque together with magnetic field $B_1$. As can be seen from the formulas above that, the co-operating quantities have the same phase angle. This is necessary for maximum torque generation.

Figure 4:
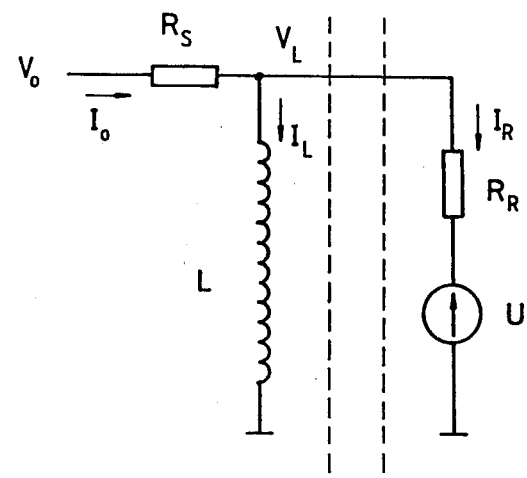
FIG. 4 is a schematic diagram of the equivalent circuit of one phase in the induction motor.

FIG. 4 is a schematic diagram of the equivalent circuit of one phase of the induction motor. The circuit includes only the primary components of the theoretical model. The broken lines represent the air-gap between stator and rotor. Components to the left of the broken lines represents the stator, and components to the right represent the rotor. Stator resistance is $R_s$, stator inductance is $L$ and rotor resistance is $R_R$. Supply voltage is $V_o$. Total current, on the stator side, is $I_o$, inductive stator current is $I_L$ and rotor current is $I_R$. Motor torque is proportional to the rotor current. The magnetizing voltage $V_L$ is transformed from the stator to the rotor through the air-gap. A counter-electromotive voltage U is induced in the rotor winding. U is proportional to the motor speed.

It is often desirable to operate the motor with a constant magnetic field amplitude. The magnetic field is generated by the inductive stator current $I_L$, which should have a constant amplitude at all frequencies. Thus, it is required that the magnetizing voltage $V_L$ increases proportionally to the frequency. In order to avoid weakening of the magnetic field it is important that the control apparatus complies with this requirement. From the following specification it will be evident that conventional control systems, that do not take the motor load into account, do not comply with this requirement.

The motor can be controlled by means of the supply voltage $V_o$ (or the total current $I_o$). Thus, the important voltage $V_L$ cannot be directly controlled. The stator current $I_L$ and the rotor current $I_R$ give a voltage drop in the stator resistance $R_S$, creating a difference between the voltages $V_o$ and $V_L$. This voltage drop is different for different motor loads, since the rotor current $I_R$ is proportional to the load. The voltage drop cannot be compensated by a fixed quantity. Lack of rotor current compensation may halve the stator magnetic field at low frequencies and thus the generated torque.

The problem with compensation for voltage drop in stator resistance $R_S$ exists only at low frequencies. At higher frequencies the voltages $V_o$ and $V_L$ are much larger than the voltage drop, which thus can be neglected.

The idealized relations in FIG. 3 show that the magnetic field and the rotor current always co-operate with correct mutual phase angle. This favourable condition is also valid for the more realistic motor model in FIG. 4. There may be a phase angle differences between the voltages $V_o$ and $V_L$, but it is the voltage $V_L$ that generates current for stator magnetization as well as rotor current. Thus, the magnetic field and the rotor current will always, and automatically co-operate with correct mutual phase angle. This is valid at all frequencies and for all shapes of the supply voltage.

Figure 5:
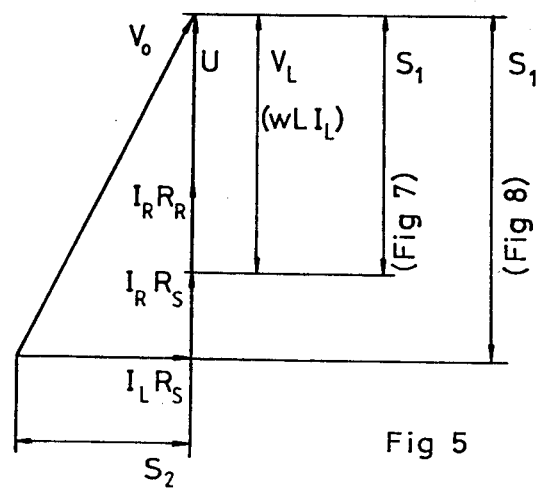
FIG. 5 is a phasor diagram showing voltages and currents in one phase of the induction motor.

FIG. 5 is a phasor diagram (vector diagram) showing voltages and currents in one phase of the induction motor according to the model in FIG. 4. The same reference character is as in FIG. 4, have been used. The magnetizing voltage $V_L$ can be calculated in two ways, either as the voltage across the stator inductance L, or as the total voltage across the rotor winding. The voltage drop over the resistance $R_S$ in the primary winding is shown in the figure, and there are two different contributions, one from the inductive magnetizing current $I_L$, and one from the resistive rotor current $I_R$. These two contributions have different phase angles.

The inductive current and the resistive current have been shown with a constant phase angle of 90°. The supply voltage $V_o$ across the primary winding will have a varying phase angle, depending on the motor's operating conditions. It is also in this way the control signals have to be generated.

Figure 6:
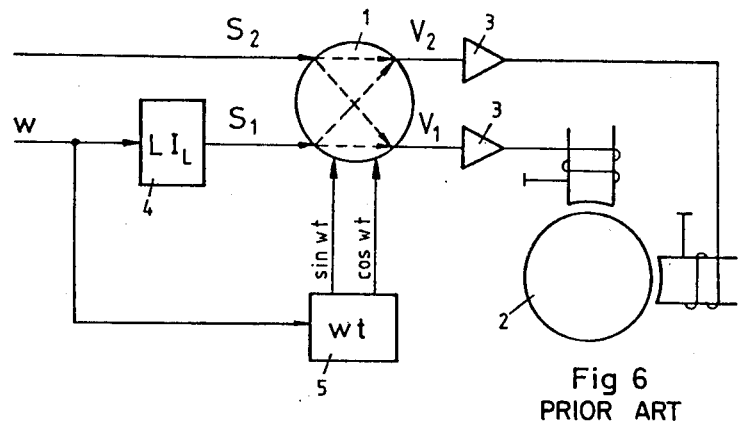
FIG. 6 is a block diagram of a known system for speed control of an induction motor.

FIG. 6 is a block diagram of a known system for speed control of an induction motor, according to the Swedish Pat. No. 334,671. The figure has been drawn using the resolver symbol 1 from FIG. 1. Initially the influence from the rotor current $I_R$ is neglected.

The control voltage is composed of two components $S'_1$ and $S_2$. These have different phase angles and are thus fed to different resolver inputs. They are multiplied by sin wt and cos wt respectively, in the resolver. The resolver output gives the required sum of the two components, according to the phasor diagram in FIG. 5. The resolver has two outputs, $V_1$ and $V_2$ with 90° phase angle, for controlling the two phases of induction motor 2. The signals are amplified by "power amplifiers" 3.

An object of the invention is to control the induction motor in the same way as a DC motor. Normally, a DC motor operates with constant stator magnetic field and is controlled by the rotor voltage. In order to operate the induction motor in the same way, according to the phasor diagram in FIG. 5, $S'_1$ shall be used to control the rotor voltage, while $S_2$ is constant. This is possible with the control system of FIG. 6. The control signal w' is multiplied by L $I_L$ in the calculating unit 4 to obtain the signal $S'_1 (=w'L\ I_L)$. The control signal w' is also connected to the oscillator 5.

The controlled oscillator 5 must be designed in such a way, that its oscillating frequency is proportional to the control signal w', and that it can operate on negative values of w'. When w' is negative, the rotating vector, which is generated by the two output signals sin wt and cos wt of the oscillator, shall change direction of rotation.

Figure 7:
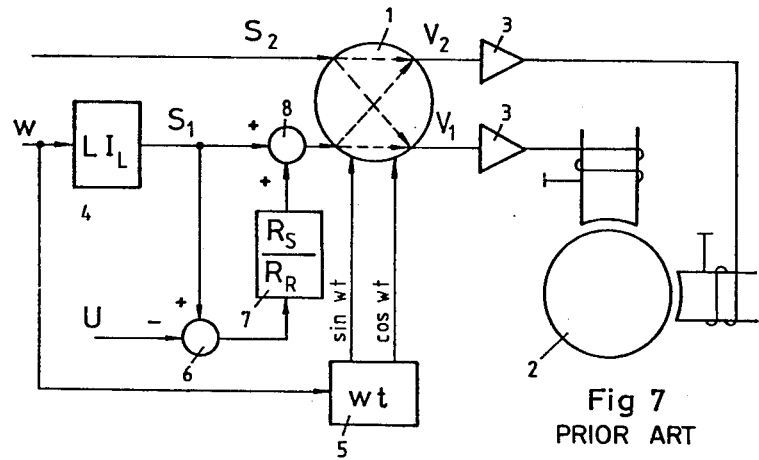
FIG. 7 is a block diagram of the same system with addition of circuits for load compensation.

FIG. 7 is a block diagram of a control system, with the addition of rotor current compensation, according to the Swedish Pat. No. 334,671.

The rotor current is proportional to the motor load, which is varying, but the current can be calculated as follows. From the equivalent circuit of one phase in the induction motor (FIG. 4) the following relation is obtained:

$$I_R = (V_L - U)/R_R \quad (1)$$

The voltage drop across the stator resistance $R_S$ can be calculated:

$$I_R R_S = (V_L - U) \times (R_S/R_R) \quad (2)$$

The block diagram of FIG. 7 shows how the compensating signal is calculated and added before the resolver input. The signal U which represents the counter-electromotive voltage, transformed to the stator side is proportional to the motor speed and can be obtained from a tachometer, connected to the motor shaft. The tachometer output must be suitably scaled. The subtracting unit 6 generates the difference signal $(V_L - U)$ and the calculating unit 7 delivers the required signal according to equation (2). The adder 8 adds the compensating signal to the signal $S'_1$.

Thus, the block diagram in FIG. 7 generates all signal components according to the phasor diagram in FIG. 5.

This control method operates correctly, although with a certain disadvantage. The tachometer signal U is added to the signal $S'_1$, by the calculating units, and thus influences the control voltage to the motor. Apart from the intended action, the tachometer signal will also adversely influence the dynamic response of the motor control system. The system in FIG. 7 includes so called tachometer feedback, or velocity feedback, well known from common control theory. This may be advantageous, but mostly disadvantageous. The basic motor control system should have no such unintentional effects.

Figure 8:
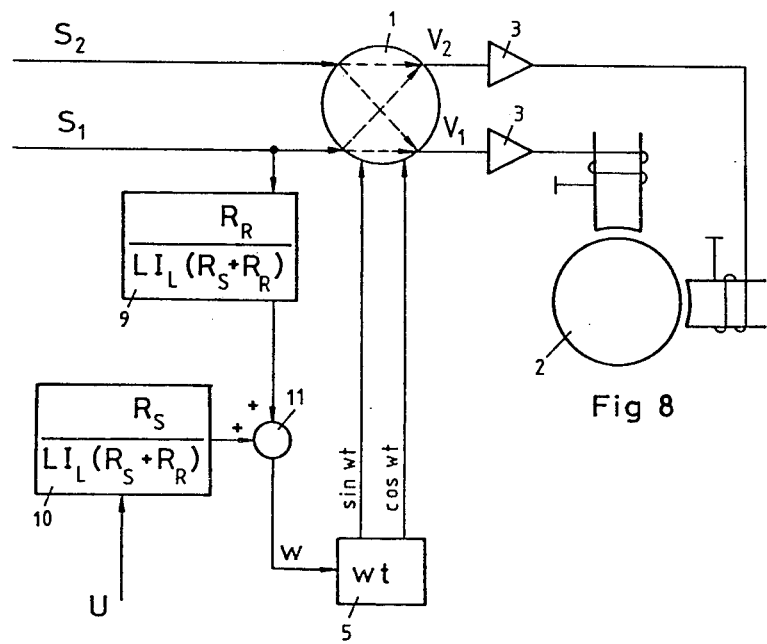
FIG. 8 is a block diagram of an apparatus according to the invention for speed control of an induction motor, with tachometer signal for load compensation.

FIG. 8 is a block diagram of an apparatus according to the invention. The basic structure from FIG. 6 is maintained, but the system for rotor current compensation is new.

The signal $S_1$ and $S_2$ are fed directly to the resolver inputs without any addition for rotor current compensation. Instead, the oscillator frequency w for optimal control is calculated. From the phasor diagram in FIG. 5 two equations are obtained:

$$S_1 = R_S I_R + wLI_L \qquad (3)$$

$$wLI_L = R_R I_R + U \qquad (4)$$

From the two equations 3 and 4 the oscillator frequency w can be solved as a function of $S_1$ and U:

$$w = S_1 \frac{R_R}{LI_L(R_S + R_R)} + U \frac{R_S}{LI_L(R_S + R_R)} \qquad (5)$$

The block diagram in FIG. 8 shows how this signal according to equation 5 is generated and fed to the oscillator input for control of the oscillator frequency. The signal $S_1$ is multiplied by a constant term in the calculating unit 9 and the signal U is multiplied by a constant term in the calculating unit 10. Then the two calculated values are added by the adder 11 and from there fed to the oscillator input.

Thus the control system according to the invention controls the motor by means of the rotor voltage. The signal $S_1$ is the actual control signal. The oscillator frequency w is automatically adjusted to the motor's operating conditions in such a way that a constant stator magnetic field is obtained. Increasing motor load will give decreasing oscillator frequency w.

The control signal $S_1$ controls the motor in the same way as a DC motor is controlled by the rotor voltage. Any outer motor control loop, for example a velocity or position control, can be connected in conventional way to the signal input $S_1$.

When controlling conventional DC motors it is common to control the rotor current as well as the magnetic field strength, depending on the operating conditions. For example "field weakening" is used for running the motor at elevated speeds. All such methods of control become possible for the induction motor as well, when using a control system according to the invention. This can be done by changing necessary parameters in the calculating circuits of the control system.

The control system according to the invention may be realized with analogue as well as with digital components, for example with a micro computer. Especially in digital designs, the possibility exists to write alternative mathematical formulas for the calculations to be performed by the control system, still within the scope of the invention.

All figures in this description have referred to a two-phase motor. By normal trigonometric coordinate transformations the system can be converted to control a motor with any number of phases. For example, the two control signals $V_1$ and $V_2$ from the resolver output can easily be converted to three-phase signals.

During motor operation copper resistance will change as a result of motor heating. It is no technical problem to measure the temperature or resistance of the motor windings and by means of these measured values adjust the resistance parameters in the calculating circuits, in order to achieve optimal control at all temperatures.

The tachometer signal, that is used in the control system according to the invention, may be obtained directly from an actual tachometer connected to the motor shaft. It is also possible to obtain the tachometer signal indirectly as a so called "reconstructed value" for example by differentiating a measured value of the motor shaft angle.

Normally, this type of control system is used for speed control of the motor. However, it is possible to control other quantities, such as the motor torque or the motor position.

I claim:

1. A method for controlling an AC induction motor comprising a stator, a rotor and at least two phase windings within its entire speed range down to and including zero speed in both directions and at all loads, in response to two control signals ($S_1$, $S_2$), a first of which ($S_1$) essentially controls rotational speed and torque, and a second of which ($S_2$) essentially controls the magnetic field of the motor, the control signals being fed to a resolver (1) having an oscillator (5) connected thereto, output signals ($V_1$, $V_2$) of the resolver being used for generating individual supply signals to each motor phase winding, and a measured signal (U) representing the rotational speed of the motor, being fed back to the control system, in which the improvement comprises:

(a) scaling the measured signal (U) representing the rotational speed of the motor to a value corresponding to the electromotive voltage of the motor,
   (b) feeding the control signals ($S_1$, $S_2$) directly to the resolver,
   (c) and controlling the frequency of the oscillator (5) in response to the first control signal ($S_1$) and the scaled value of the signal (U) according to the formula:

$$w = S_1 \times \frac{R_R}{LI_L(R_S + R_R)} + U \times \frac{R_S}{LI_L(R_S + R_R)}$$

where:
   $R_S$ = resistance of the stator winding
   $R_R$ = resistance of the rotor winding
   L = inductance of the stator winding
   $I_L$ = the magnetizing current of the stator winding
   U = the stator transformed counter-electromotive voltage of the rotor winding
   $S_1$ = the first control signal
   w = frequency of the oscillator
whereby the angular frequency (w) of the oscillator will increase with increase in the first control signal ($S_1$) and at increasing motor speed and decrease with increase in motor load, and the stator magnetic field at all motor speeds and all motor loads automatically is retained at constant amplitude.

2. An apparatus for controlling an AC induction motor comprising a stator, a rotor and at least two phase windings within its entire speed range down to and including zero speed in both directions and at all loads, in response to two control signals ($S_1$, $S_2$) a first of which ($S_1$) essentially controls rotational speed and torque, and a second of which ($S_2$) essentially controls the magnetic field of the motor, the control signals being fed to a resolver (1) having an oscillator (5) connected thereto output signals ($V_1$, $V_2$) of the resolver being for generating individual supply signals to each motor phase winding, and a measured signal (U) representing the rotational speed of the motor, being fed back to the control system, wherein the improvement comprises:
- (a) means for scaling the measured signal (U) to a value corresponding to the electromotive voltage of the rotor,
- (b) means for feeding the control signals ($S_1$, $S_2$) directly to the resolver, and
- (c) means for controlling the angular frequency of the oscillator (5) in response to the first control signal ($S_1$) and the scaled value of signal (U) according to the formula:

$$w = S_1 \times \frac{R_R}{LI_L \times (R_S + R_R)} + U \times \frac{R_S}{LI_L(R_S + R_R)}$$

where:
- $R_S$ = resistance of the stator winding
- $R_R$ = resistance of the rotor winding
- L = inductance of the stator winding
- $I_L$ = the magnetizing current of the stator winding
- U = the stator transformed counter-electromotive voltage of the rotor winding
- $S_1$ = the first control signal
- w = frequency of the oscillator.

* * * * *